UNITED STATES PATENT OFFICE.

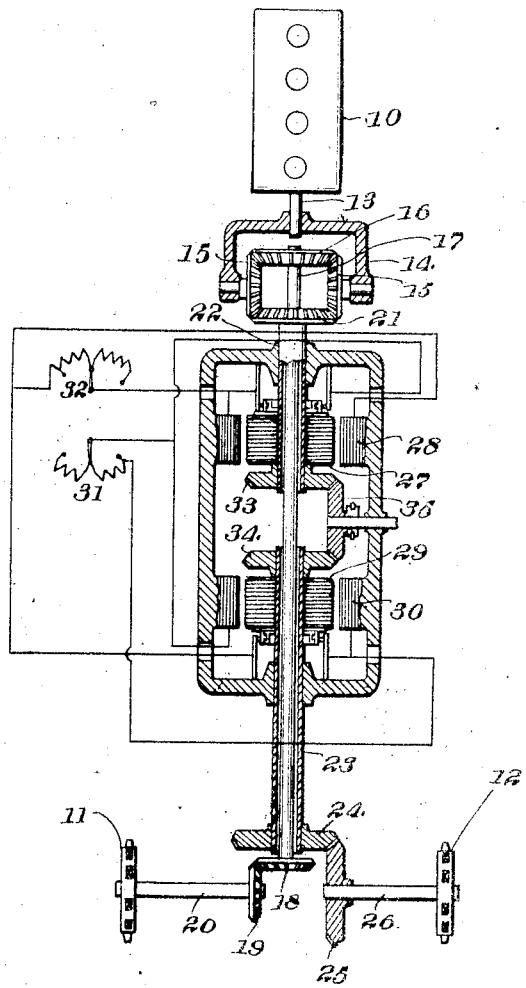

FRIEDEL COLLISCHONN, OF FRANKFORT-ON-THE-MAIN, GERMANY, ASSIGNOR, BY MESNE ASSIGNMENTS, TO GENERAL ELECTRIC COMPANY, A CORPORATION OF NEW YORK.

DYNAMO-ELECTRIC VARIABLE GEARING.

1,083,729.  Specification of Letters Patent.  Patented Jan. 6, 1914.

Application filed June 30, 1909. Serial No. 505,301.

*To all whom it may concern:*

Be it known that I, FRIEDEL COLLISCHONN, a subject of the German Emperor, and a resident of Frankfort-on-the-Main, Germany, have invented certain new and useful Improvements in Dynamo-Electric Variable Gearings, of which the following is a specification.

This invention relates to variable speed gearing and more particularly to that type in which the whole or part of the power delivered by an engine or prime mover is transformed into electrical energy and subsequently transformed back by means of a motor.

In motor vehicles as now constructed, an engine is used which may be considered a high speed engine and therefore it is necessary to provide a reduction gearing between the engine and the driven members or the wheels. There is also provided a change speed gearing in the line of connection between the engine and the driven members so that the ratio of transmission between the engine and the driven members may be varied. It will be seen however that this reduction of speed through the change speed gearing necessarily involves loss. The practice therefore is to provide for a direct drive connection between the engine and the driven shaft connected to the driven members so that the change speed gearing may be cut out, the speed being controlled under ordinary conditions by means of a throttle valve, in case the engine is a hydrocarbon engine, and the change speed gearing proper is thrown into operation only when climbing hills or when it is desired to run the vehicle at an exceedingly low speed. The objection to toothed change speed gearing, however, is the large loss by friction, the wear, the noise, and the uneconomical operation. Another objection to toothed change speed gearing is that the speed can only be varied in steps and not gradually, the ordinary motor vehicle being adapted for two to four speed changes.

The object of this invention is to construct a change speed gearing which will not be open to the objection of the ordinary type, which will be economical in operation, and which will be exceedingly flexible and adapted to gradual changes of speed.

In accordance with this invention, an electrical change speed gearing is placed in the line of transmission between the engine and the driven members. The engine drives a compensating device or differential, one of the elements of which has a mechanical connection with one of the driven members, and the other element of which has a connection with the other driven member, the driven members being connected each to a driving wheel of the vehicle. In the line of connection between the compensating device and a second driven member are a plurality of couplings, one of which is an electrical coupling and the other a mechanical coupling. The electrical coupling is preferably of the generator-motor type in which the current generated by the generator is delivered to the motor, and from there the energy is transformed back into mechanical energy to the driven member. The gearing is so arranged that either one of these couplings may be thrown into and out of operation so as to make the driving connection either an electrical or a mechanical connection.

The invention will be described in connection with the accompanying drawings, in which the figure is a plan view showing an application of the gearing forming the subject-matter of this invention, parts being shown in section.

Referring to the drawings, 10 designates a prime mover or engine preferably of the hydrocarbon type, although it may be any other type of engine, and 11 and 12 designate the driven members, which in this case are sprockets arranged to transmit power to the driving wheels of a motor vehicle, although the invention is not necessarily limited to this application of the invention. The driving shaft 13 of the engine is connected to drive a compensating device or differential 14, provided with the usual differential pinions 15. One of the elements 16 of the compensating device has a mechanical connection with the shaft 20 of one of the driven members 11 through a shaft 17 and bevel gears 18 and 19. The other element 21 has a connection with the shaft 26 of the other driven member 12 through a sectional shaft comprising sections 22 and 23, and through bevel gears 24 and 25 on the shaft section 23 and the shaft 26 respectively. The shaft 17 and the shaft sections 22 and 23 are in nested relation as shown, and the shaft sections 22 and 23 are arranged to be coupled to transmit power from the section 22 to the section 23 by means of a plurality of couplings, one of which is an electrical and the other a mechanical coupling. The electrical coupling consists of a generator-motor coupling. The generator comprises an armature 27 rigidly secured to and driven from the shaft 22, and a field 28. The motor comprises an armature 29 rigidly secured to and driving the shaft 23, and a field 30. The fields 28 and 30 are stationary as shown while the armatures revolve. The generator is driven by the engine and through shaft 22 generates current which is transmitted to the motor so as to transform the electrical energy back into the mechanical energy at the motor shaft 23. The generator motor set is controlled by means of suitable rheostats 31 and 32 substantially as shown in U. S. Patent to Albrecht, No. 861,931, July 30, 1907, Fig. 5. The shaft sections 22 and 23 are provided with suitable members 33 and 34 respectively, which are arranged to be engaged by a sliding coupling member 35 so as to clutch the shaft sections together. It will be understood of course that the shafts 22 and 23 rotate in opposite directions while the shaft 17 rotates in the same direction as the shaft section 22.

It will be seen that there is a mechanical connection between the engine and one of the driven members, namely 11, but the connection between the engine and the other driven member 12 can be made either an electrical or mechanical connection, at will. By throwing out the coupling member 35 and closing the electrical circuit, the connection will be through the generator-motor set and the driven members can be driven at any desired speed by regulating the rheostats 31 and 32. At high speed, a direct drive may be obtained by opening the generator-motor circuit by means of a suitable switch as is well known to those skilled in the art, and the coupling member 35 can then be thrown into engagement with 33 and 34, so as to provide a mechanical connection between the engine and both driven members.

Due to the fact that two series-wound machines are used, one as a generator and the other as a motor, the arrangement is almost perfectly self-regulating. If, for any reason, the driving member 12 slows down while being driven by its generator motor coupling, the armature 29 of the motor will also slow down. Consequently a very small counterelectromotive force is exercised by the motor thereby causing an increase of current to flow. This throws proportionate additional work upon the generator which will then also slow down. The difference in power delivered by the constant speed engine is then balanced by the compensating device or differential.

It will thus be seen that this invention accomplishes the objects aimed at. An exceedingly simple and efficient gearing is produced by means of which the driven members, or the vehicle in case the gearing is used in connection with a motor vehicle, can be driven at any desired speed, in which the speed can be changed gradually by means of the rheostats 31 and 32, and in which a direct drive may be readily obtained by throwing out the electrical coupling and throwing in the mechanical coupling.

Having thus described the invention, what is claimed is:

1. The combination with a plurality of driven members and an engine, of a compensating device connecting said engine with one of said driven members, a generator-motor coupling connecting the engine with another of said driven members, and means for mechanically connecting the members of said coupling.

2. The combination with a plurality of driven members and an engine, of a compensating device connecting said engine with one of said driven members, a generator-motor coupling connecting the engine with another of said driven members, and means for making it a mechanical connection, said means being capable of being cut out.

3. The combination with a pair of driven members and an engine, of a compensating device comprising a pair of elements, means connecting one of the elements of said device to one of said driven members, a generator-motor coupling for connecting the other of the elements of said device to the other of said driven members, and means for mechanically connecting the members of said coupling.

4. The combination with a plurality of driven members and an engine, of a pair of nested shafts connected to said engine and said driven members, one of said shafts comprising sections, and a generator-motor coupling connecting said sections.

5. The combination with a plurality of driven members and an engine, of a pair of nested shafts connected to said engine and said driven members, one of said shafts comprising sections, a generator-motor coupling connecting said sections, and means for mechanically connecting the members of said coupling.

6. The combination with a plurality of driven members and an engine, of a pair of nested shafts connected to said engine and said driven members, one of said shafts comprising sections, and a generator-motor and a mechanical coupling connecting said sections.

7. The combination with a plurality of driven members and an engine, of a compensating device driven by the engine, and a mechanical and a generator-motor connection between said compensating device and said driven members.

8. The combination with a pair of driven members, and an engine, of a compensating device driven by the engine, a mechanical connection between one of the elements of said device and one of said driven members, and a generator-motor and a mechanical coupling between the other element of said device and the other of said members.

9. The combination with a plurality of driven members and an engine, of a compensating device driven by the engine, a pair of shafts connecting said device with said driven members, one of said shafts being sectional, and a generator-motor and a mechanical coupling connecting said sections.

In testimony whereof I have signed my name to this specification in the presence of two subscribing witnesses.

FRIEDEL COLLISCHONN.

Witnesses:
JEAN GRUND,
ERWIN DIBBEL.